March 1, 1966 — F. E. SANVILLE — 3,237,633
PNEUMATIC TRANSDUCERS
Filed Oct. 22, 1962 — 3 Sheets-Sheet 1
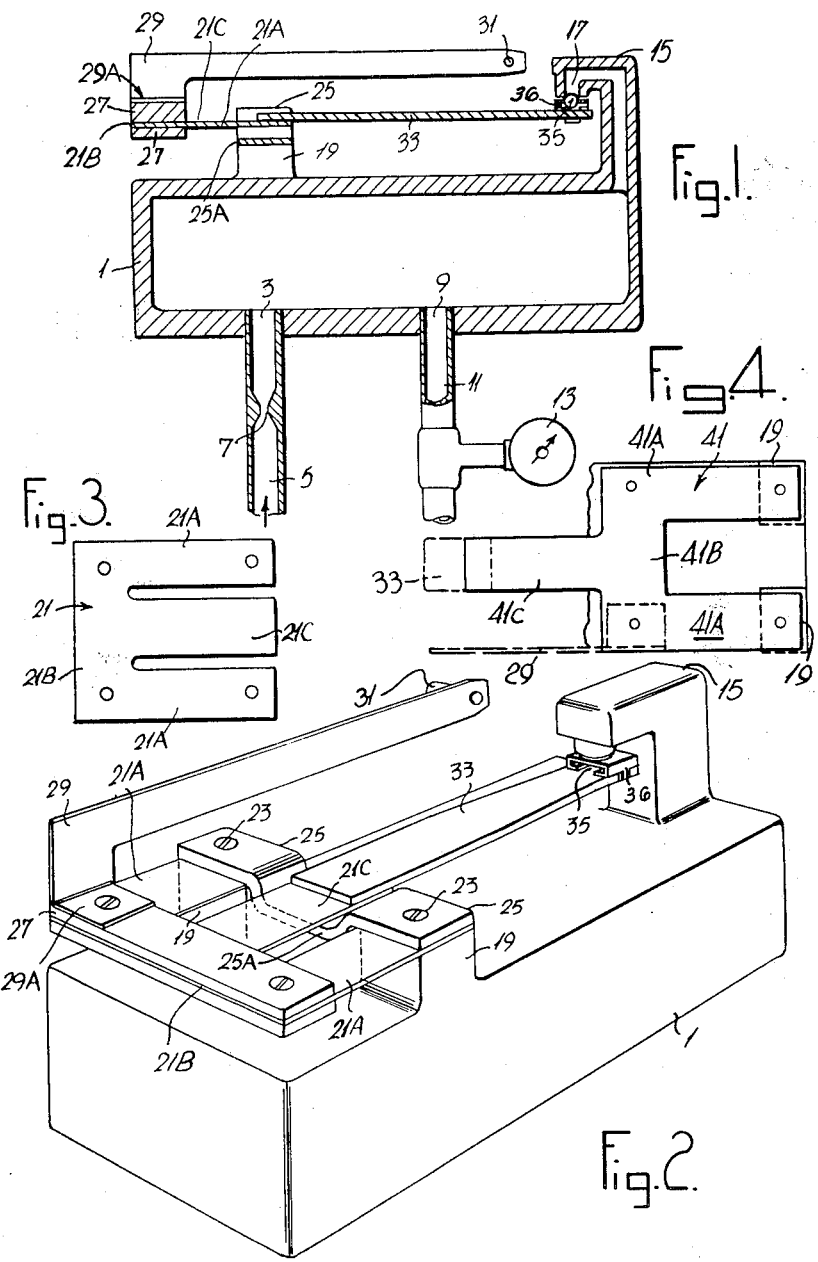

March 1, 1966     F. E. SANVILLE     3,237,633
PNEUMATIC TRANSDUCERS
Filed Oct. 22, 1962     3 Sheets-Sheet 2
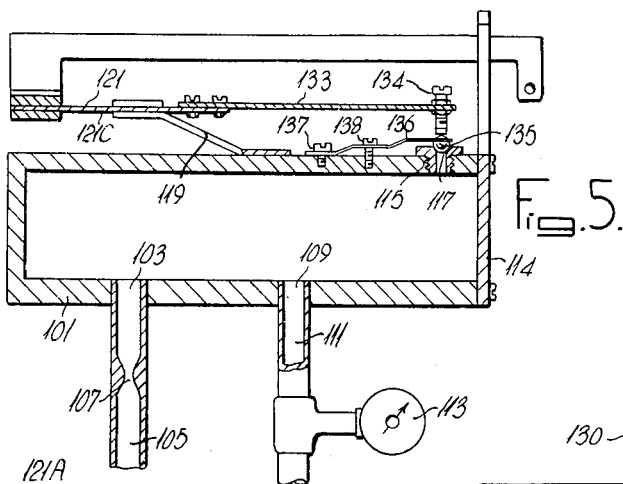
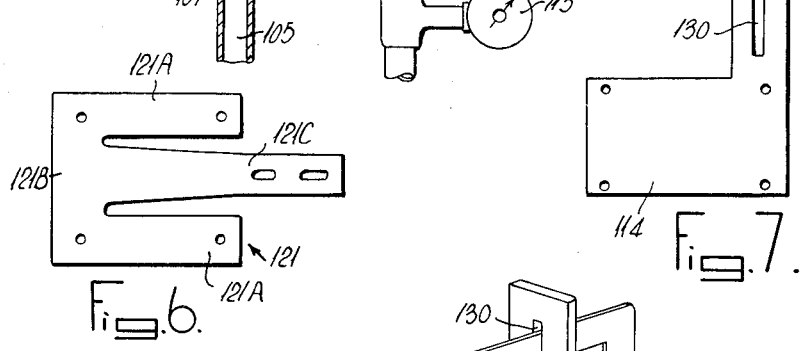
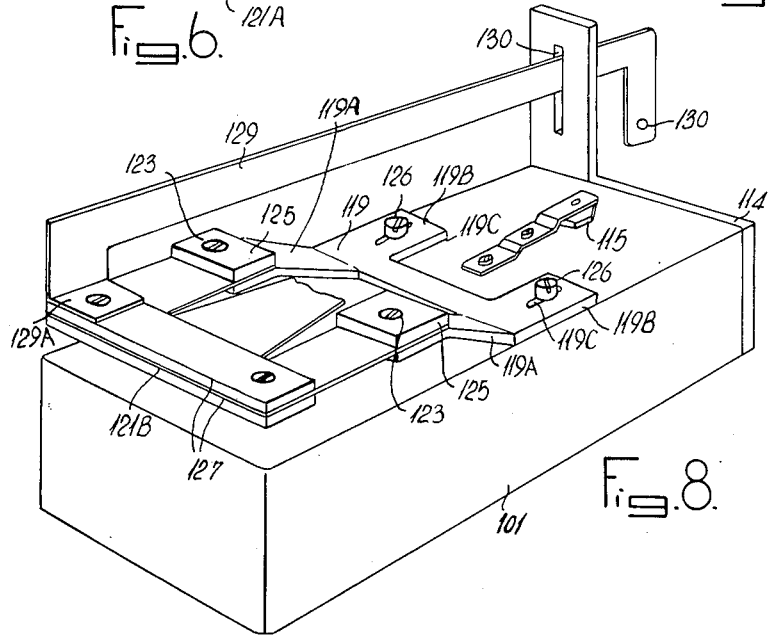

March 1, 1966     F. E. SANVILLE     3,237,633
PNEUMATIC TRANSDUCERS

Filed Oct. 22, 1962     3 Sheets-Sheet 3

INVENTOR
FRANK EDWARD SANVILLE

BY Larson and Taylor

ATTORNEYS

United States Patent Office 3,237,633
Patented Mar. 1, 1966

3,237,633
PNEUMATIC TRANSDUCERS
Frank Edward Sanville, Bishop's Stortford, England, assignor to Associated Electrical Industries Limited, London, England, a British company
Filed Oct. 22, 1962, Ser. No. 232,083
Claims priority, application Great Britain, Nov. 9, 1961, 40,188/61
4 Claims. (Cl. 137—82)

This invention relates to improvements in or relating to pneumatic transducers in which the positioning of a mechanical member determines the magnitude of a pneumatic signal pressure.

Such transducers find application in indicating and recording instruments such as are used in controlling industrial processes. Often departure of a condition being metered by the indicating and recording instrument from a predetermined value is required to modify a pneumatic control pressure which through suitable pneumatic relays effects a control tending to return the condition being metered to its optimum value.

The indicating and recording instrument may be, for example, a potentiometric type instrument in which a fixed D.C. voltage is applied across a potentiometer slide wire and a D.C. input voltage indicative of the condition being metered is compared with the voltage between one end of the slide wire and the slider. Any error voltage is "chopped" at a mains frequency and the resulting A.C. error voltage is amplified and used to control a motor which moves the slider to reduce the error voltage to or substantially to, zero.

An object of the invention is the provision of an improved pneumatic transducer.

According to one aspect of the present invention, a pneumatic transducer adapted to produce a variable output pressure in accordance with the positioning of an input member comprises a pneumatic reservoir, means for supplying compressed air under a constant pressure through a restriction to the reservoir, a sharp-edged circular discharge port from the reservoir, a control member in the form of a ball mounted on or engaged by a lever and movable with or by the lever over a range of positions in which it blocks the discharge port to different degrees, and mechanical means coupling the input member to the lever, whereby the pressure in the reservoir serves as an output pressure which varies with the positioning of the input member.

According to another aspect of the present invention, a pneumatic transducer adapted to produce a variable output pressure in accordance with the positioning of an input member comprises a pneumatic reservoir, means for supplying compressed air under a constant pressure through a restriction to the reservoir, a discharge port from the reservoir, a control member mounted on or engaged by a lever and movable with or by the lever over a range of positions in which it blocks the discharge port to different degrees, and a flat E-shaped spring member having the free ends of its two outer limbs fixedly mounted on the pneumatic reservoir, the input member being coupled to the base part of the spring member so that movement of the input member causes flexing of the two outer limbs about a common transverse axis, and the lever being mounted on the central limb of the spring member and extending in the same general direction as that limb, whereby the pressure in the reservoir serves as an output pressure which varies with the positioning of the input member.

According to a further aspect of the invention, a pneumatic transducer adapted to produce a variable output pressure in accordance with the positioning of an input member, comprises a pneumatic reservoir, means for supplying compressed air under a constant pressure through a restriction to the reservoir, a discharge port from the reservoir, a control member mounted on or engaged by a lever and movable with or by the lever over a range of positions in which it blocks the discharge port to different degrees, and a flat spring member having two spaced, parallel outer limbs connected together at one end to, and extending in the same direction from, a transversely extending base part and a third, inner limb parallel to the outer limbs but extending away from the base part of the spring member so that movement of the ends of its two outer limbs fixedly mounted on the pneumatic reservoir, the input member being coupled to the base part of the spring member so that movement of the input member causes flexing of the two outer limbs about a common transverse axis, and the lever being mounted on the central limb of the spring member and extending in the same general direction as that limb whereby the pressure in the reservoir serves as an output pressure which varies with the positioning of the input member.

The invention will now be described, by way of example, with reference to the accompanying drawings in which:

FIGURE 1 is a diagrammatic sectional side elevation of a mechanical/pneumatic transducer incorporating the invention;

FIGURE 2 is a perspective drawing of the transducer shown in FIGURE 1;

FIGURE 3 is a plan view of spring means shown in FIGURES 1 and 2;

FIGURE 4 is a plan view of an alternative form of the spring means shown in FIGURE 3;

FIGURE 5 is a diagrammatic sectional side elevation of an alternative form of mechanical/pneumatic transducer;

FIGURE 6 is a plan view of spring means shown in FIGURE 5;

FIGURE 7 is an end elevation, showing an end closure plate shown in FIGURE 5;

FIGURE 8 is a perspective drawing of the transducer shown in FIGURE 5, but with certain detail omitted for clarity;

Figure 9:
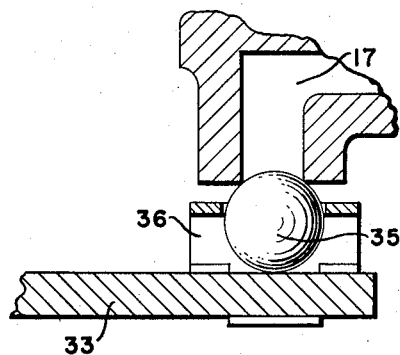
FIGURE 9 is a fragmentary sectional side elevation of the ball mounting means shown in FIGURE 1 but drawn to a larger scale.

Referring now to the embodiment of the invention shown in FIGURES 1 to 3, the mechanical/pneumatic transducer includes a reservoir 1 in the form of a rectangular box which also acts as the body on which other parts of the transducer are mounted. This reservoir is formed with an air inlet 3 to which is connected an air supply pipe 5 in which is incorporated a restriction in the form of an orifice 7. An outlet port 9 from the reservoir communicates by a pipe 11 with a pressure gauge 13 and with the input of a relay (not shown) which is to be controlled by the transducer.

Provided on top of the reservoir 1 at one end is a hollow L-shaped structure 15 terminating in a downwardly directed circular port 17 which, through the structure, is in communication with the reservoir. Provided on the top of the reservoir 1 towards the opposite end are two laterally spaced upward projections 19. Clamped on to the top of these is a flat spring steel member 21 (FIG. 3) which is approximately E-shaped, each of the two outer limbs 21A being clamped to one of the projections by a clamping screw 23 extending through a cap member 25 and the limb 21A and screw-threaded into the projection 19. Cap member 25 includes two flat aligned end parts engaging the limbs 21A and a central, downwardly offset portion 25A. The body part 21B of the spring member 21 is stiffened by the clamping thereto of two metal strips 27 respectively on opposite sides of part 21B and of the same length as that part. Mounted on the top of the end of the upper of these strips 27, and extending parallel to the limbs 21A, is an input lever 29 formed from a flat strip of L-shape with its shorter leg 29A cranked for attachment to upper strip 27. Since the remainder of the strip forming lever 29 lies in a vertical plane, the lever is stiff as regards vertical movement of the free end of lever 29, which is provided with a laterally extending pin 31 forming an input member for the transducer. It will be seen that vertical movement of pin 31 will cause vertical movement of the body part 21B of the spring member 21 as the limbs 21A bend about a transverse axis close to the projections 19. At the same time, the central limb 21C of the spring member 21 will tilt to change the inclination of its longitudinal axis.

Attached to the free end of the central limb 21C is a rigid arm 33 at the free end of which is mounted a ball 35 secured in a spring clip 36 (see FIGURE 9) such that the ball can move laterally through small distances but cannot become detached from the arm 33. The diameter of the ball is larger than the diameter of the port 17, and the outer end of the port is sharp-edged, that is to say the outer end of the port is not rounded or countersunk.

When the transducer is incorporated in a potentiometric indicating and recording instrument, the mechanism by which the slider of the instrument potentiometer is moved is connected through a cam and a cam follower to the pin 31 of the lever 29, so that movement of the slider is accompanied by vertical movement of the pin 31.

In use of the transducer, compressed air is supplied under a pressure of 20 to 25 pounds per square inch to the pipe 5, and flows through the orifice 7 into the reservoir 1, the orifice 7 causing a reduction in the pressure of the air flowing through it to the working range of 3 to 15 pounds per square inch. Air escapes from the reservoir 1 through the port 17 past the ball 35. The pressure which builds up in the reservoir will depend upon the throttling effect exerted on this escaping air, and will be indicated on the pressure gauge 13 and applied to the controlled relay through pipe 11. If the pin 31 is raised somewhat, the throttling effect exerted on the escaping air will be increased, and the pressure in the reservoir will increase, so raising the pressure in pipe 11. It will be seen that the pressure in pipe 11 will vary with variation in the position of the pin 31.

With the arrangement of ball 35 and port 17 shown, the force exerted by the escaping air on the ball 35 is proportional to the pressure of the escaping air. However, with the mechanical connection shown between pin 31 and ball 35, the torque exerted on the arm 33 is proportional to the displacement of the pin 31, so that the force tending to move the ball 35 upwards is also proportional to the displacement of the pin 31. When the ball is in a stable position, the forces exerted on it by the arm 33 and the escaping air balance, so that the air pressure in the reservoir is also proportional to the displacement of the pin 31 from a neutral position in which it causes no upward force on the ball 35.

If ball 35 did not move at all vertically in setting up a balance condition, then the pressure in the reservoir would be proportional to the displacement of the pin 31. In practice, it is necessary to consider the modification of the above result due to the actual movement of the ball 35 in setting up a balance condition. However, the necessary movement of the ball can be made very small, and to a close approximation the control pressure does vary proportionally to the displacement of the pin 31.

By the use of a sharp-edged port 17, the effective area of the ball on which the escaping air acts tends to remain constant, and this improves the stability of the positioning of the ball relative to the port. By the use of the E-shaped spring member a simpler and cheaper assembly is provided.

Figure 10:
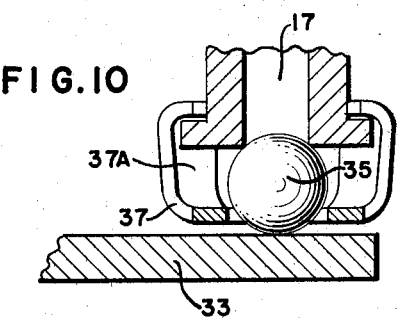
FIGURES 10 and 11 are fragmentary sectional side elevations of alternative forms of the ball mounting means shown in FIGURE 9.
Figure 11:
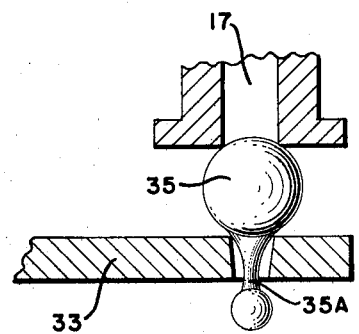

The ball must be capable of lateral movement, since it is not practicable to position it fixedly with sufficient accuracy for it to be properly centered coaxially with the port 17 to control the flow of air therefrom. One manner of retaining the ball in position while permitting limited lateral movement is to use a clip in the form of a spider 37 (FIGURE 10) cut out from sheet metal with a central hole through which the ball can engage the lever 33, the legs 37A of the spider being bent up on opposite side of the ball 35 and serving to secure the clip to the sides of the nozzle in which port 17 is formed. Alternatively, the ball 35 can be provided with a stem or stalk 35A (FIGURE 11) by which it is fitted to the lever 33, the stem or stalk being such that limited lateral movement of the ball can take place.

In the modificaton shown in FIGURE 4, the E-shaped spring 21 is replaced with a flat spring member 41 having two spaced, parallel outer limbs 41A connected together at one end to, and extending in the same direction from, a transversely extending base part 41B and a third, inner limb 41c parallel to the outer limbs but extending away from the base part in the opposite direction. In this modified construction, the two projections 19 are disposed on the side of the base part 41B of the spring which is remote from the ball 35, while the lever 29 and arm 33 remain substantially as shown.

Referring now to the embodiment of the invention shown in FIGURES 5 to 8, this construction is in most respects similar to that of FIGURES 1 to 3, but the port corresponding to port 17 faces upwards and is mounted directly in the body while the projections 19 are eliminated by mounting the E-shaped spring on a bracket secured to the body.

In this embodiment the reservoir 101 is in the form of a rectangular box which also acts as the body on which other parts of the transducer are mounted, and is formed with an air inlet 103 to which is connected an air supply pipe 105 in which is corporated a restriction in the form of an orifice 107. An outlet port 109 from the reservoir communicates by a pipe 111 with a pressure gauge 113 and with the input of a relay (not shown) which is to be controlled by the transducer. An open end of the body is closed by a removable cover plate 114.

Provided on top of the reservoir 1 near one end is a screwed nozzle 115 providing an upwardly directed circular port 117 which is in communication with the reservoir. Clamped to the top of the reservoir is a bracket member 119, to the top of which is clamped a flat spring steel member 121 (see FIGURE 6) which is approximately E-shaped, each of the two outer limbs 121A being clamped to one limb of the bracket 119 by a clamping screw 123 extending through a cap member 125 and the limb 121A and screw-threaded into the limb of bracket member 119. Bracket member 119 includes two flat aligned parts onto which the limbs 121A are clamped and joined by cranked portions 119A to two flat aligned parts 119B which are provided with slots 119C through which extend stud bolts 126 which secure the bracket to the reservoir. The body part 121B of the spring member 121 is stiffened by the clamping thereto of two metal strips 127 respectively on opposite sides of part 121B and of the same length as that part. Mounted on the top of the end of the upper of these strips 127, and extending parallel to the limbs 121A, is an input lever 129 formed from a flat strip of metal with a part 129A bent over for attachment to upper strip 127. Since the remainder of the strip forming lever 129 lies in a vertical plane, the lever is stiff as regards vertical movement of the free end of lever 129, which extends through a guiding slot 130 in the end plate 114 and is provided with a hole 131 to accommodate a driving pin for the transducer.

Attached to the free end of the central limb 121C is a rigid arm 133 at the free end of which is mounted a screw 134 having a plane lower end arranged to engage a ball 135 lying in the open end of port 117 and held in place by a spring clip 136. The spring clip is secured to the reservoir by a stud bolt 137 and the degre of freedom given to the ball 135 is readily adjustable by a screw 138 extending through a cranked central part of the spring clip and screwed into a blind threaded hole in the reservoir. Thus the ball can move laterally through small distances but cannot become detached from the reservoir. The diameter of the ball is larger than the diameter of the port 17, and the outer end of the port is sharp-edged, that is to say the outer end of the port is not rounded or countersunk.

The manner in which this embodiment of the transducer is used is similar to the manner described above in connection with the transducer of FIGURES 1 to 3. The effective stiffness of the central limb 121C of the spring member 121 can be varied by adjustment of the arm 133 axially relative to the limb. To this end the holes in the arm 121C, for the bolts clamping the arm to the limb, are axially elongated. Since the screw 134 must remain opposite the ball 135, the arm 133 cannot be moved axially, so that the adjustment involves movement of the bracket 119 together with the spring member 121 and the input lever 129.

Since the screw 134 can be moved axially relative to the arm 133, a zero-setting adjustment of the transducer is possible.

What I claim is:

1. A pneumatic transducer adapted to produce a variable output pressure comprising:
   (a) a pneumatic reservoir;
   (b) an inlet port;
   (c) a passage through which the inlet port communicates with the interior of the reservoir;
   (d) a restriction in the said passage;
   (e) a sharp edged circular discharge port from the reservoir;
   (f) a control lever;
   (g) a control member in the form of a ball movable with the control lever over a range of positions in which the ball blocks the discharge port to different degrees;
   (h) an outlet port from the reservoir;
   (i) an input member;
   (j) a flat spring member having two spaced parallel outer limbs connected together at one end to, and extending in the same direction from, a transversely extending base part, and a third inner limb extending from the base part parallel to the outer limbs and in the same general direction as the control member, the free ends of the two outer limbs being fixedly mounted on the pneumatic reservoir;
   (k) a connection between the input member and the base part of the spring member such that movement of the input member causes flexing of the two outer limbs about an axis common to both outer limbs;
   (l) and a connection between the control lever and the central limb of the spring member;
   whereby when compressed air under a constant pressure is supplied to the inlet port the pressure in the reservoir varies with the positioning of the input member and serves as the output pressure at the outlet port.

2. A pneumatic transducer is claimed in claim 1, wherein the control lever is readily adjustable lengthwise of the central limb of the spring member, whereby the effective stiffness of the spring member can be adjusted.

3. A pneumatic transducer as claimed in claim 1, wherein the said third inner limb extends away from the base part in the same direction as the outer limbs.

4. A pneumatic transducer as claimed in claim 1, wherein the said third inner limb extends away from the base part in the opposite direction to the outer limbs.

References Cited by the Examiner

UNITED STATES PATENTS

| | | | |
|---|---|---|---|
| 2,816,562 | 12/1957 | Dyson | 137—85 |
| 2,837,104 | 6/1958 | Side | 137—82 |
| 2,960,097 | 11/1960 | Scheffler | 137—82 |

FOREIGN PATENTS 1,075,197  4/1954  France.

ISADOR WEIL, Primary Examiner.

WILLIAM F. O'DEA, ALAN COHAN, Examiners.